United States Patent
Yu et al.

(10) Patent No.: US 8,199,526 B2
(45) Date of Patent: Jun. 12, 2012

(54) WIRELESS COMMUNICATION DEVICE FOR ELECTRONIC APPARATUS

(75) Inventors: Xiao-Hui Yu, Shenzhen (CN); Wen-Hsiang Hung, Taipei Hsien (TW); Xiao-Yong Ma, Shenzhen (CN); Meng-Ping Xu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/944,664

(22) Filed: Nov. 11, 2010

(65) Prior Publication Data

US 2012/0075824 A1 Mar. 29, 2012

(30) Foreign Application Priority Data

Sep. 29, 2010 (CN) .......................... 2010 1 0296627

(51) Int. Cl.
*H05K 5/00* (2006.01)
*H05K 7/00* (2006.01)
*H05K 7/12* (2006.01)

(52) U.S. Cl. .............. 361/809; 361/679.01; 361/679.02; 361/679.58; 361/679.4; 361/807; 312/222; 312/215; 312/223.1; 455/347; 455/348; 455/349

(58) Field of Classification Search .................. 361/801, 361/809, 679.58, 726, 740, 759, 679.01, 361/679.02, 679.4, 724, 748, 752, 807; 455/347–349; 312/222, 215, 223.1; 174/50
See application file for complete search history.

(56) References Cited

U.S. PATENT DOCUMENTS

| | | | | |
|---|---|---|---|---|
| 4,092,698 | A * | 5/1978 | Brefka ......................... | 361/752 |
| 4,991,056 | A * | 2/1991 | Shimizu et al. ........... | 361/679.02 |
| 5,329,422 | A * | 7/1994 | Sasaki ....................... | 361/679.32 |
| 6,111,760 | A * | 8/2000 | Nixon ........................ | 361/814 |
| 6,119,138 | A * | 9/2000 | Pinckney et al. ............ | 708/109 |
| 6,157,540 | A * | 12/2000 | Eddings et al. ............... | 361/727 |
| 6,295,197 | B1 * | 9/2001 | Watts et al. ................ | 361/679.4 |
| 6,707,674 | B1 * | 3/2004 | Bryant et al. ................. | 361/704 |
| 7,315,444 | B2 * | 1/2008 | Chen et al. ............... | 361/679.55 |
| 7,411,783 | B2 * | 8/2008 | Su ............................ | 361/679.55 |
| 7,420,800 | B1 * | 9/2008 | Knapp et al. ............. | 361/679.55 |
| 7,495,910 | B2 * | 2/2009 | Yang ............................ | 361/695 |
| 7,557,305 | B2 * | 7/2009 | Su et al. ......................... | 174/376 |
| 7,719,825 | B1 * | 5/2010 | Knapp et al. ............. | 361/679.02 |
| 7,724,540 | B1 * | 5/2010 | Fox et al. ....................... | 361/809 |
| 7,916,466 | B2 * | 3/2011 | Cheng et al. ............... | 361/679.4 |

* cited by examiner

*Primary Examiner* — Angel R Estrada
*Assistant Examiner* — Dimary Lopez
(74) *Attorney, Agent, or Firm* — Altis Law Group, Inc.

(57) ABSTRACT

An exemplary electronic apparatus includes a housing, a wireless communication device disposed on the housing, and a motherboard received in the housing. The wireless communication device includes a circuit board and a wireless communication module disposed on the circuit board. The circuit board is connected the motherboard by electrical wires. The wireless communication module is located at an outside of the housing.

18 Claims, 4 Drawing Sheets

WIRELESS COMMUNICATION DEVICE FOR ELECTRONIC APPARATUS

BACKGROUND

1. Technical Field

The disclosure relates to wireless short-range radio communication devices for computers, such devices typically being Bluetooth devices.

2. Description of Related Art

Many electronic products such as personal computers and mobile phones use wireless means to communicate with each other over short distances. Such means include Bluetooth devices (Bluetooth is a registered certification mark). Conventionally, a Bluetooth device is directly embedded in a socket of a motherboard of a computer. Typically, a plurality of electronic components such as CPUs (central processing units) are also provided on the motherboard. Some of these electronic components may generate electromagnetic radiation during operation, and such radiation is liable to cause EMI (Electromagnetic Interference) in various other of the electronic components on the motherboard. In particular, the EMI may disturb the Bluetooth device transmitting and receiving signals. Moreover, since the Bluetooth device is received in a housing of the computer, the housing is liable to block the Bluetooth device from transmitting and receiving signals normally. An antenna needs to be installed outside the housing, so that the Bluetooth device can transmit and receive signals conveniently.

What is needed, therefore, is a wireless communication device for use in an electronic apparatus which can overcome the limitations described.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the views.

DETAILED DESCRIPTION

Figure 1:
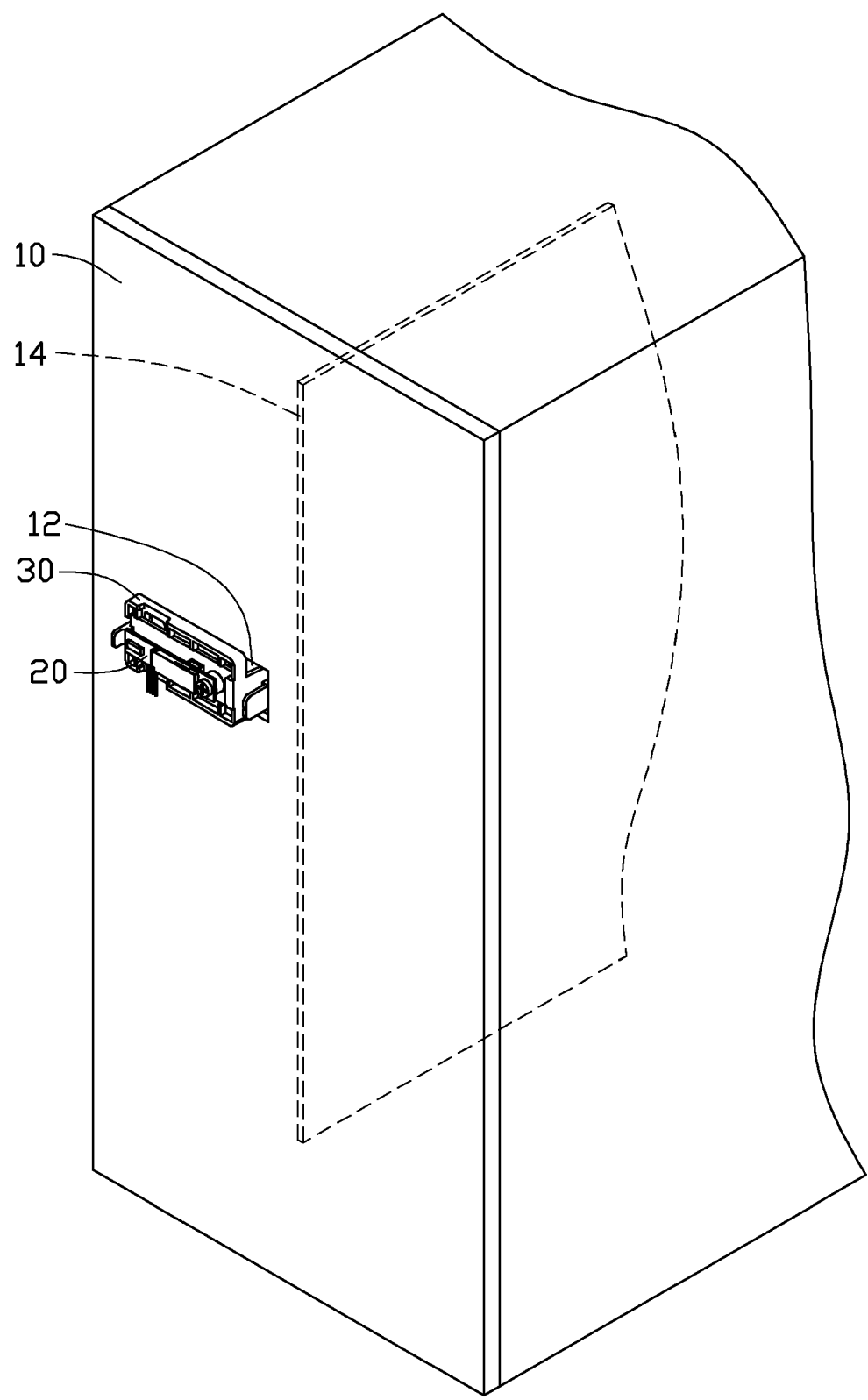
FIG. 1 is an isometric, assembled view of an electronic apparatus in accordance with an embodiment of the disclosure.

Referring to FIG. 1, an electronic apparatus in accordance with an embodiment of the disclosure includes a housing 10 and a wireless communication device 20 mounted on the housing 10. The wireless communication device 20 is typically a short-range radio communication device such as a Bluetooth device.

Figure 2:
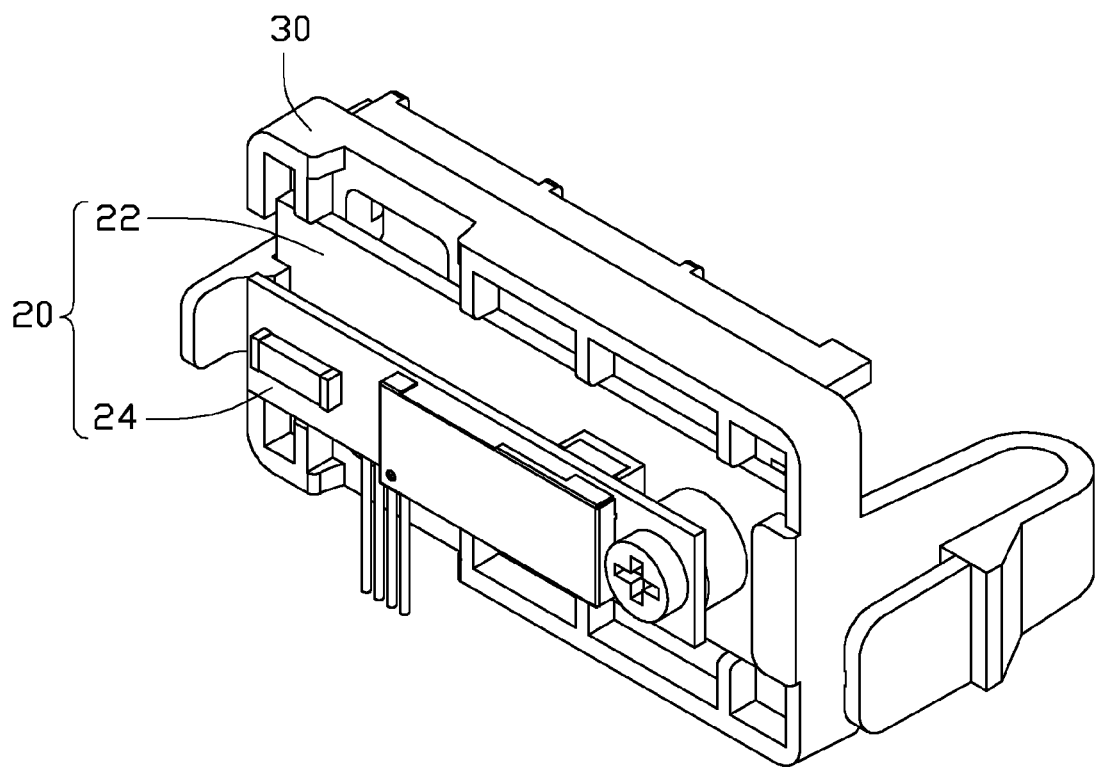
FIG. 2 is an enlarged, isometric, assembled view of a wireless communication device of the electronic apparatus.
Figure 3:
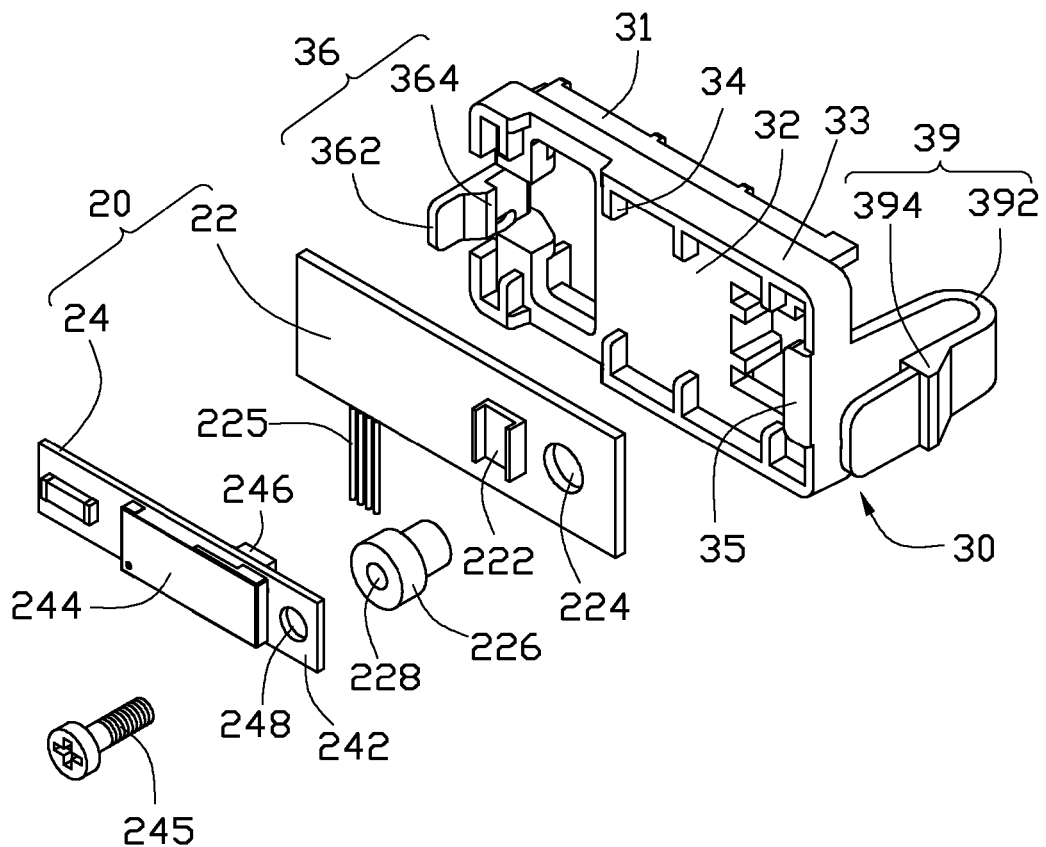
FIG. 3 is an exploded view of the wireless communication device of FIG. 2.

Also referring to FIGS. 2-3, the wireless communication device 20 includes a circuit board 22, a wireless communication module 24 disposed on the circuit board 22, and a fastening element 30 for fastening the wireless communication device 20 on the housing 10. The wireless communication module 24 is typically a Bluetooth module. A socket 222 is disposed on the circuit board 22. A circular through hole 224 is defined in the circuit board 22 near the socket 222. A pin 226 extends through the through hole 224 of the circuit board 22 and is fastened on the circuit board 22. The pin 226 defines a threaded hole 228 in a center thereof. A plurality of electrical wires 225 connect the circuit board 22. The wireless communication module 24 includes a base plate 242, a chip 244 disposed on a front face of the base plate 242, and a protrusion 246 formed on a rear face of the base plate 242. A circular through hole 248 is defined in the base plate 242 near the chip 244. The protrusion 246 and the through hole 248 of the wireless communication module 24 respectively correspond to the socket 222 and the through hole 224 of the circuit board 22.

A motherboard 14 is disposed in the housing 10. The circuit board 22 of the wireless communication device 20 connects the motherboard 14 via the electrical wires 225. The housing 10 defines a substantially rectangular through hole 12, corresponding to the fastening element 30.

Figure 4:
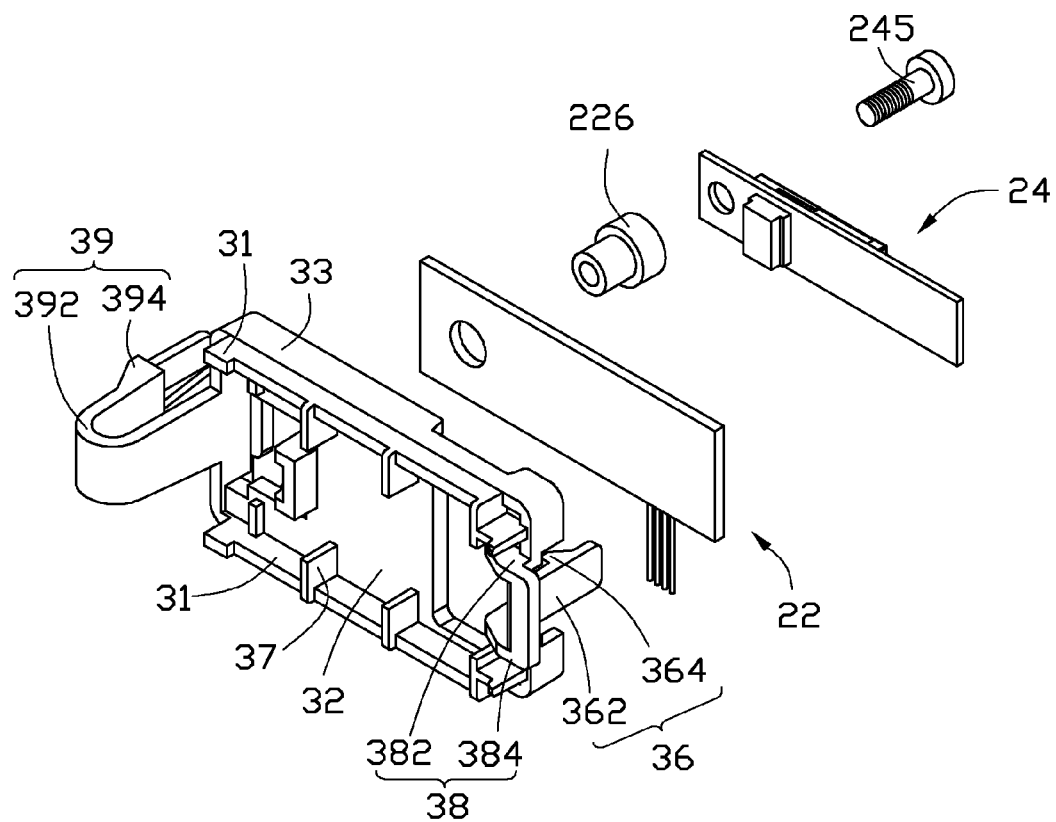
FIG. 4 is an inverted view of the wireless communication device of FIG. 3.

Also referring to FIG. 4, the fastening element 30 is integrally made of a material such as plastic. The fastening element 30 includes a rectangular plate 32. A first side wall 33 extends perpendicularly forward generally from three edges of a periphery of a first (front) face of the plate 32. A plurality of spaced limiting portions 34 extend perpendicularly inward from inner sides of opposite top and bottom portions of the first side wall 33. A distance between every two opposite limiting portions 34 at the top and bottom portions of the first side wall 33 is substantially equal to a width of the circuit board 22 of the wireless communication device 20. A pressing portion 35 extends horizontally inward from an inner side of a lateral side portion of the first side wall 33. The pressing portion 35 is parallel to the plate 32. A buckle 36 extends perpendicularly from an end of the plate 32 opposite to the pressing portion 35. The buckle 36 includes a body 362 perpendicular to the plate 32, and a wedge-shaped block 364 protruding inward from an inner side of the body 362. Thus, the plate 32, the first side wall 33, the limiting portions 34, the pressing portion 35 and the buckle 36 together form a receiving space (not labeled) for receiving the circuit board 22 therein.

Two second side walls 31 extend perpendicularly rearward from opposite top and bottom edges of a second (rear) face of the plate 32. A plurality of reinforcing ribs 37 are formed between the second side walls 31 and the plate 32, to help prevent the second side walls 31 from deforming when subjected to an external force. An abutting portion 38 extends from an end of the second face of the plate 32, adjacent to the buckle 36 at the first face of the plate 32. The abutting portion 38 includes a base 382 extending perpendicularly from the plate 32, and a baffle portion 384 extending horizontally outwardly from the base 382. A clasp 39 extends from another end of the second face of the plate 32 opposite to the abutting portion 38. The clasp 39 includes a U-shaped base 392 extending perpendicularly rearward from the plate 32, and a wedge-shaped block 394 protruding from an outer side of the base 392.

In assembly, the protrusion 246 of the wireless communication module 24 is embedded in the socket 222 of the circuit board 22, so that the through hole 248 of the wireless communication module 24 is in alignment with the threaded hole 228 of the pin 226 on the circuit board 22. A screw 245 extends through the through hole 248 of the wireless communication module 24, and is screwed into the threaded hole 228 of the pin 226 on the circuit board 22 to fasten the wireless communication module 24 onto the circuit board 22. The circuit board 22 of the wireless communication device 20 is inserted into the receiving space of the fastening element 30.

One end of the circuit board 22 abuts against an inner side of the pressing portion 35, and an opposite end of the circuit board 22 is buckled on the block 364 of the buckle 36, whereby the wireless communication device 20 is fastened on the fastening element 30. The baffle portion 384 of the abutting portion 38 of the fastening element 30 extends through the through hole 12 of the housing 10 and abuts against an inner face of the housing 10. The second side walls 31 and the clasp 39 of the fastening element 30 extend through the through hole 12 of the housing 10. The base 392 of the clasp 39 is confined by the housing 10 to deform inward, so that the block 394 of the clasp 39 is clasped on the inner face of the housing 10, and four corners of the base 32 of the fastening element 30 abut an outer face of the housing 10. Thus, the fastening element 30 is fastened on the housing 10, with the wireless communication device 20 located outside the housing 10.

According to the disclosure, since the wireless communication device 20 is disposed on and located at the outer side of the housing 10, there is no need for an antenna to be installed outside the housing 10. This reduces costs. Furthermore, since the wireless communication device 20 is located far from the motherboard 14, electromagnetic radiation generated from other electronic components on the motherboard 14 can be effectively prevented from disturbing the wireless communication device 20. That is, the wireless communication device 20 is protected from EMI.

It is believed that the exemplary embodiments and their advantages will be understood from the foregoing description, and it will be apparent that various changes may be made thereto without departing from the spirit and scope of the disclosure or sacrificing all of the material advantages set forth, the examples hereinbefore described merely being preferred or exemplary embodiments.

What is claimed is:

1. An electronic apparatus comprising:
a housing;
a motherboard received in the housing; and
a wireless communication device disposed on the housing and comprising a circuit board and a wireless communication module disposed on the circuit board, the circuit board being connected to the motherboard by electrical wires, the wireless communication module being located at an outside of the housing;
wherein a socket is disposed on the circuit board, the wireless communication module comprises a base plate, a chip disposed on a front face of the base plate, and a protrusion formed on a rear face of the base plate, and the protrusion of the wireless communication module is embedded in the socket of the circuit board.

2. The electronic apparatus of claim 1, wherein the wireless communication device further comprises a fastening element fastened on the housing, and the circuit board is fastened on the fastening element.

3. The electronic apparatus of claim 2, wherein the fastening element comprises a plate, a first side wall extending perpendicularly forward from a periphery of a first face of the plate, a pressing portion extending inward from an inner side of the first side wall, and a buckle extending perpendicularly from an end of the plate opposite to the pressing portion, the pressing portion and the buckle respectively abutting against two ends of the circuit board of the wireless communication device.

4. The electronic apparatus of claim 3, wherein the fastening element further comprises a plurality of spaced limiting portions extending perpendicularly inward from inner sides of opposite top and bottom portions of the first side wall, a distance between every two opposite limiting portions at the top and bottom portions of the first side wall being substantially equal to a width of the circuit board of the wireless communication device, the plate, the first side wall, the limiting portions, the pressing portion and the buckle cooperatively forming a receiving space receiving the circuit board therein.

5. The electronic apparatus of claim 3, wherein the buckle comprises a body perpendicular to the plate and a wedge-shaped block protruding inward from an inner side of the body.

6. The electronic apparatus of claim 3, wherein the plate also has a second face, the first and second faces being at opposite sides of the plate, and the fastening element further comprises an abutting portion extending from an end of the second face of the plate, and a clasp extending from another end of the second face of the plate opposite to the abutting portion, the housing defining a through hole, and the abutting portion and the clasp extending through the through hole of the housing and being buckled on an inner face of the housing.

7. The electronic apparatus of claim 6, wherein the abutting portion comprises a base extending perpendicularly from the plate, and a baffle portion extending horizontally outwardly from the base.

8. The electronic apparatus of claim 6, wherein the clasp comprises a U-shaped base extending perpendicularly rearwardly from the plate, and a wedge-shaped block protruding from an outer side of the base.

9. The electronic apparatus of claim 6, wherein the fastening element further comprises two second side walls extending perpendicularly rearward from opposite top and bottom edges of the second face of the plate, the second side walls extending through the through hole of the housing.

10. The electronic apparatus of claim 9, wherein the fastening element further comprises a plurality of reinforcing ribs formed between the second side walls and the plate.

11. A wireless communication device comprising:
a fastening element adapted for fastening the wireless communication device on a housing of an electronic apparatus;
a circuit board fastened on the fastening element; and
a wireless communication module disposed on the circuit board;
wherein when the fastening element fastens the wireless communication device on the housing of an electronic apparatus, the wireless communication module is located outside the housing;
wherein the fastening element comprises a plate, a first side wall extending perpendicularly forward from a periphery of a first face of the plate, a pressing portion extending inward from an inner side of the first side wall, and a buckle extending perpendicularly from an end of the plate opposite to the pressing portion, the pressing portion and the buckle respectively abutting against two ends of the circuit board of the wireless communication device; and
wherein the buckle comprises a body perpendicular to the plate and a wedge-shaped block protruding inward from an inner side of the body, the wedge-shaped block being buckled between the circuit board and the wireless communication module.

12. The wireless communication device of claim 11, wherein the fastening element further comprises a plurality of spaced limiting portions extending perpendicularly inward from inner sides of opposite top and bottom portions of the first side wall, a distance between every two opposite limiting portions at the top and bottom portions of the first side wall being substantially equal to a width of the circuit board of the wireless communication device, the plate, the first side wall, the limiting portions, the pressing portion and the buckle cooperatively forming a receiving space for receiving the circuit board therein.

13. The wireless communication device of claim 11, wherein the fastening element further comprises an abutting portion extending from an end of a second face of the plate, and a clasp extending from another end of the second face of the plate opposite to the abutting portion, the housing defining a through hole, the abutting portion and the clasp extending through the through hole of the housing and being buckled on an inner face of the housing.

14. The wireless communication device of claim 13, wherein the abutting portion comprises a base extending perpendicularly from the plate, and a baffle portion extending horizontally outwardly from the base.

15. The wireless communication device of claim 13, wherein the clasp comprises a U-shaped base extending perpendicularly rearwardly from the plate, and a wedge-shaped block protruding from an outer side of the base.

16. The wireless communication device of claim 13, wherein the fastening element further comprises two second side walls extending perpendicularly rearward from opposite top and bottom edges of the second face of the plate, the second side walls extending through the through hole of the housing.

17. The wireless communication device of claim 16, wherein the fastening element further comprises a plurality of reinforcing ribs formed between the second side walls and the plate.

18. An electronic apparatus comprising:
a housing;
a motherboard received in the housing; and
a wireless communication device comprising a fastening element fastening the wireless communication device on the housing, a circuit board fastened on the fastening element and a wireless communication module disposed on the circuit board, the circuit board being connected to the motherboard by electrical wires, the wireless communication module being located at an outside of the housing;
wherein a through hole is defined in the circuit board, and the wireless communication module comprises a base plate, and a chip disposed on the base plate, with a through hole being defined in the base plate; and
a pin extends through the through hole of the circuit board and is fastened on the circuit board, the pin defining a threaded hole in a center thereof; and a screw extends through the through hole of the wireless communication module and is screwed into the threaded hole of the pin on the circuit board to fasten the wireless communication module onto the circuit board.

* * * * *